US011325587B2

(12) United States Patent
Günzel (10) Patent No.: US 11,325,587 B2
(45) Date of Patent: May 10, 2022

(54) AUTOMATED CONTROL OF A MOTOR VEHICLE DURING PARKING MANEUVERS

(71) Applicant: Volkswagen Aktiengesellschaft, Wolfsburg (DE)

(72) Inventor: Thorben Günzel, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 290 days.

(21) Appl. No.: 16/721,315

(22) Filed: Dec. 19, 2019

(65) Prior Publication Data

US 2020/0198623 A1 Jun. 25, 2020

(30) Foreign Application Priority Data

Dec. 20, 2018 (DE) ...................... 10 2018 222 531.1

(51) Int. Cl.
*B60W 30/06* (2006.01)
*B60W 30/09* (2012.01)
*B60W 30/095* (2012.01)

(52) U.S. Cl.
CPC ............ *B60W 30/06* (2013.01); *B60W 30/09* (2013.01); *B60W 30/095* (2013.01)

(58) Field of Classification Search
CPC ..... B60W 30/06; B60W 30/09; B60W 30/095
USPC .......................................................... 701/25
See application file for complete search history.

(56) References Cited

U.S. PATENT DOCUMENTS

| 2016/0068158 A1* | 3/2016 | Elwart | B60W 50/10 |
| | | | 701/41 |
| 2016/0193996 A1* | 7/2016 | Stefan | B60W 40/02 |
| | | | 701/25 |
| 2017/0015312 A1* | 1/2017 | Latotzki | B60W 30/06 |
| 2018/0105167 A1* | 4/2018 | Kim | B60W 50/14 |

(Continued)

FOREIGN PATENT DOCUMENTS

| DE | 102011080932 A1 | 2/2013 |
| DE | 102015112311 A1 | 2/2017 |

(Continued)

OTHER PUBLICATIONS

German Office Action from corresponding German Application No. 10 2018 222 531.1, dated Aug. 28, 2019.

*Primary Examiner* — Peter D Nolan
*Assistant Examiner* — Luke Huynh
(74) *Attorney, Agent, or Firm* — Loza & Loza, LLP; Peter Zura (57) ABSTRACT

A method directed to at least partially automated control of a motor vehicle while entering or exiting a parking space, including determining a destination position for the motor vehicle following the automated entering or exiting of a parking space; determining a trajectory the motor vehicle to reach the destination position from a starting position of the motor vehicle; providing data representing ground-level obstacles along the trajectory. If ground-level obstacle is detected along the trajectory, determining at least one longitudinal control parameter of the motor vehicle for driving over the ground-level obstacle. At least partially automated movement of the motor vehicle from the starting position until reaching the destination position long the determined trajectory by the at least one longitudinal control of the motor vehicle.

20 Claims, 3 Drawing Sheets

(56) References Cited

U.S. PATENT DOCUMENTS

2018/0356819 A1\* 12/2018 Mahabadi .............. G08G 1/166
2018/0362024 A1\* 12/2018 Ernesti ................. B60W 30/00

FOREIGN PATENT DOCUMENTS

| | | |
|---|---|---|
| DE | 102017111874 A1 | 12/2018 |
| EP | 2327574 A1 | 6/2011 |
| EP | 3219584 A1 | 9/2017 |
| EP | 3416016 A1 | 12/2018 |

\* cited by examiner

AUTOMATED CONTROL OF A MOTOR VEHICLE DURING PARKING MANEUVERS

CROSS-REFERENCE TO RELATED APPLICATION(S)

This patent application claims priority to German patent application DE 10 2018 222 531.1, which was filed on Dec. 20, 2018, the entire disclosure of which is hereby incorporated by reference.

BACKGROUND

Motor vehicles, such as automobiles and trucks, can have driver assistance systems by which a vehicle user is assisted when entering or exiting a parking space for the vehicle. These driver assistance systems provide control over the longitudinal and transverse guidance of the motor vehicle, for example, while the vehicle is maneuvered into or out of a parking space. Longitudinal guidance refers to the forward and backward movement of the vehicle, and transverse guidance refers to the right and left movement of the vehicle. Typically, both longitudinal and transverse guidance and movement of the vehicle are needed for the vehicle to enter or exit a parking space.

The existence of ground-level obstacles, such as, for example, speed bumps, gutters or curbs, and objects on the roadway can make the longitudinal guidance of the motor vehicle considerably more difficult, such that timely consideration of ground-level obstacles would facilitate coordinated control of the motor vehicle. Systems do exist for assisting a driver of a vehicle in carrying out at least partially automatic driving maneuvers in circumstances where ground-level obstacles exist in the vicinity of the vehicle, comprising obstacles that might be driven over. Such ground-level obstacles in the vicinity of the vehicle can be identified directly, for example by environment sensors, or indirectly, for example, by digital information from a navigation system or from cloud services. Based on constructive features of the ground-level objects, parameters, such as a speed, a trajectory, or a steering adjustment, can be determined for driving around or driving over the ground-level obstacles, so that vibrations during the execution of the driving maneuvers can be lessened.

Also, systems for addressing contacting a curb forming an edge of a parking space have been developed. A parking space can be detected by a sensor, and based on the relative positions of the motor vehicle and the detected parking space, a driving trajectory for parking the vehicle in the space is determined. When maneuvering the motor vehicle along the driving trajectory, for example by a gas and brake pedal actuated driver assistance system, a contact of at least one wheel of the motor vehicle with a curb is detected. If the at least one wheel is sensed to roll up on the curb, the speed of the vehicle motor is increased to accommodate driving the vehicle onto the curb. However, this technique can result in a violent ride for the user of the motor vehicle and damage to the motor vehicle.

Unfortunately, present systems for at least partially automated control of a motor vehicle have limitations which need to be addressed. For example, driving over or near a ground-level obstacle can cause damage to the motor vehicle. Also, driving over or bumping into an obstacle can cause severe bumps or vibrations to the user of the motor vehicle, compromising the driving comfort of the vehicle user. Further, too slow a speed during the automated control of the motor vehicle can needlessly delay the vehicle user from arriving at her destination. Too fast a speed during the automated control of the motor vehicle can cause loss of control of the vehicle, such as for example on slippery surfaces, and damage to the motor vehicle and injury to the vehicle user.

SUMMARY

In general terms, this patent document is directed to automatically adjusting vehicle control parameters during parking maneuvers that are at least partially automated.

DETAILED DESCRIPTION

Various embodiments are described in detail with reference to the drawings. Reference to the drawings and the various embodiments in this written specification does not limit the scope of the claims attached hereto. Additionally, the examples set forth in this written description are not intended to be limiting and merely set forth some of the many possible embodiments for the appended claims.

For purposes of this patent document, the terms "or" and "and" shall mean "and/or" unless stated otherwise or clearly intended otherwise by the context of their use. Whenever appropriate, terms used in the singular also will include the plural and vice versa. Use of the term "a" means "one or more" unless stated otherwise or where the use of "one or more" is clearly inappropriate. Use of the terms "comprise," "comprises," "comprising," "include," "includes," "including," "having," and "has" are interchangeable and are not intended to be limiting. For example, the term "including" shall mean "including, but not limited to." The term "such as" also is not intended to be limiting.

Terms such as "substantially" or "about" when used with values or structural elements provide a tolerance that is ordinarily found during testing and production due to variations and inexact tolerances in factors such as materials and equipment. These terms also provide a tolerance for variations due to environmental conditions such as temperature and humidity. Such variations also can be due to normal wear and tear over the life of apparatuses that embody the apended claims.

In general terms, this patent document is directed to adjusting vehicle control parameters during parking maneuvers. This patent document also is directed to adjusting vehicle control parameters to avoid or otherwise encounter ground-level obstacles, and then automatically readjusting or restoring the control parameters to a value substantially the same as their original values after the avoidance of or encounter with the ground-level obstacle is partially or entirely complete. A ground-level object is an object or feature in the ground that the vehicle can drive over or otherwise traverse.

The at least partially automated control of the motor vehicle disclosed and recited in this application is understood to mean a highly automated, a fully automated, or a driverless implementation of the entering or exiting the parking space. When preparing to enter or exit a parking space, a destination position is determined. The destination position identifies a parking space into which the motor vehicle is to be parked or, when the vehicle is already parked, the destination position represents the location to which the motor vehicle is to be moved after it has been removed from the parking space. The destination position can be detected, for example, from a plurality of sensor devices, in particular on or within the motor vehicle, and transmitted via a communication link between the motor vehicle and a vehicle-external server device. Exemplary embodiments control movement of the motor vehicle through an environment from a starting position to the designated position.

An environment proximate to the motor vehicle, including the starting position and the destination position for the motor vehicle, can be detected with the sensor devices 14. The sensor devices 14 comprise, for example, ultrasonic sensors, laser sensors, LIDAR sensors, radar sensors, infrared sensors and optical sensors, such as cameras. One or more vehicle-external server devices may, for example, be associated with a parking infrastructure, such as a parking garage or a parking lot. In this case, the parking infrastructure has at least one parking space for the motor vehicle. Information that is detected by the vehicle-side sensor devices and transmitted by the one or more vehicle-external server devices can include a distance of a current vehicle position to the determined destination position and potentially passable surfaces for moving and parking the motor vehicle. A vehicle-side device is a device connected to or associated with the vehicle, whether inside the vehicle or outside the vehicle. A vehicle-external device is a device that is separate or remote from the vehicle and associated with a different location or structure, such as a computer server associated with a garage.

The communication link over which sensor signals, data, information, and commands are transmitted can include any private or public, wired or wireless network, including but not limited to Local Area Networks, Wide Area Networks, the Internet, the World Wide Web, radio frequency (RF), Bluetooth, and a Cloud-based network. At each node of the communication link, there can be an exemplary network server, one or more databases, one or more storage devices, and one or more communication devices. There can be more servers, more databases, more storage devices, and more communication devices, with the servers and communication devices minimally configured with memory, at least one processor, communication resources, and with the databases being external to or integrated with the servers and communication devices.

Figure 1:
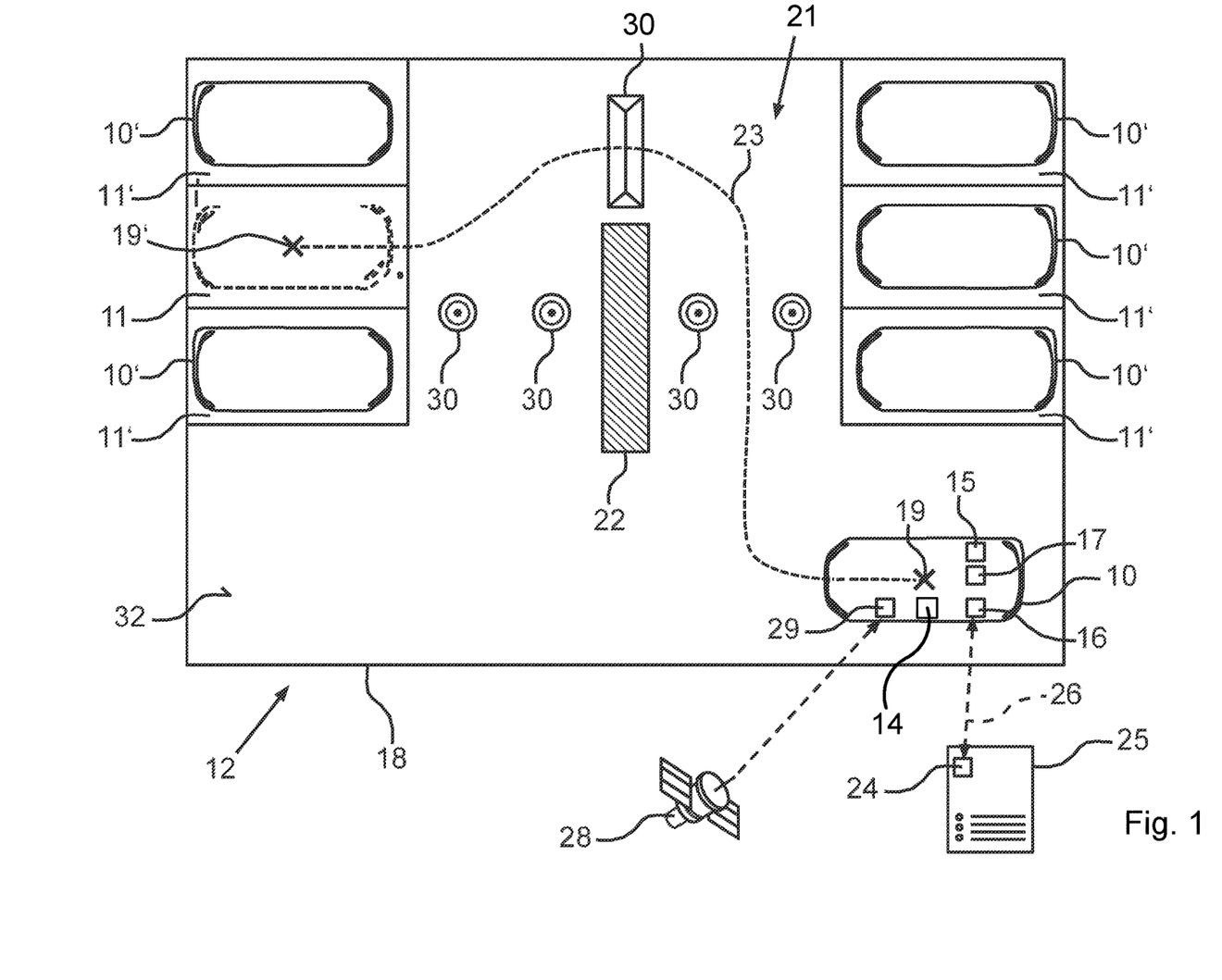
FIG. 1 illustrates a schematic representation of a motor vehicle located near parking spaces, the vehicle capable of at least a partially automated process of entering or exiting a parking space of a parking infrastructure.

Referring initially to FIG. 1, there is shown a motor vehicle 10 according to exemplary embodiments, which is at least partially parked in a parking space 11. In this exemplary case of a parked motor vehicle 10, the parking space 11 is located in a parking garage 12 on a parking garage level 32. The parking garage 12 is understood generally to mean a parking infrastructure, which can be, for example, an uncovered parking lot or a parking strip. In the case of multi-story car garages 12, which have a plurality of parking garage levels 32, parking garage level 32 is also understood to mean a parking infrastructure level. Exemplary embodiments also provide for at least partially automated control of the motor vehicle for entering or exiting a parking space that is not located in a parking infrastructure, wherein the parking space can be on a street, on the shoulder of a road, within a residential garage, and other structures and locations.

According to example embodiments, the motor vehicle 10 is moved from the starting position 19 to the destination position 19' and parked in a parking space at the destination position 19' when the parking process is performed. When exiting the parking space, the motor vehicle 10 is removed from the parking space and moved from the starting position in the parking space to the destination position different from the starting position. That is, the parking space comprises either the destination position or the starting position depending on whether the motor vehicle 10 is entering or exiting the parking space. The starting position being different from the parking space during the exiting process, or the destination position being different from the parking space during the parking process when, for example, a transfer station at which the motor vehicle 10 begins entering the parking space or stops exiting the parking space. Therefore, based on the identification of the parking space, the process of entering or exiting the parking space is identifiable and can be controlled accordingly.

Figure 2:
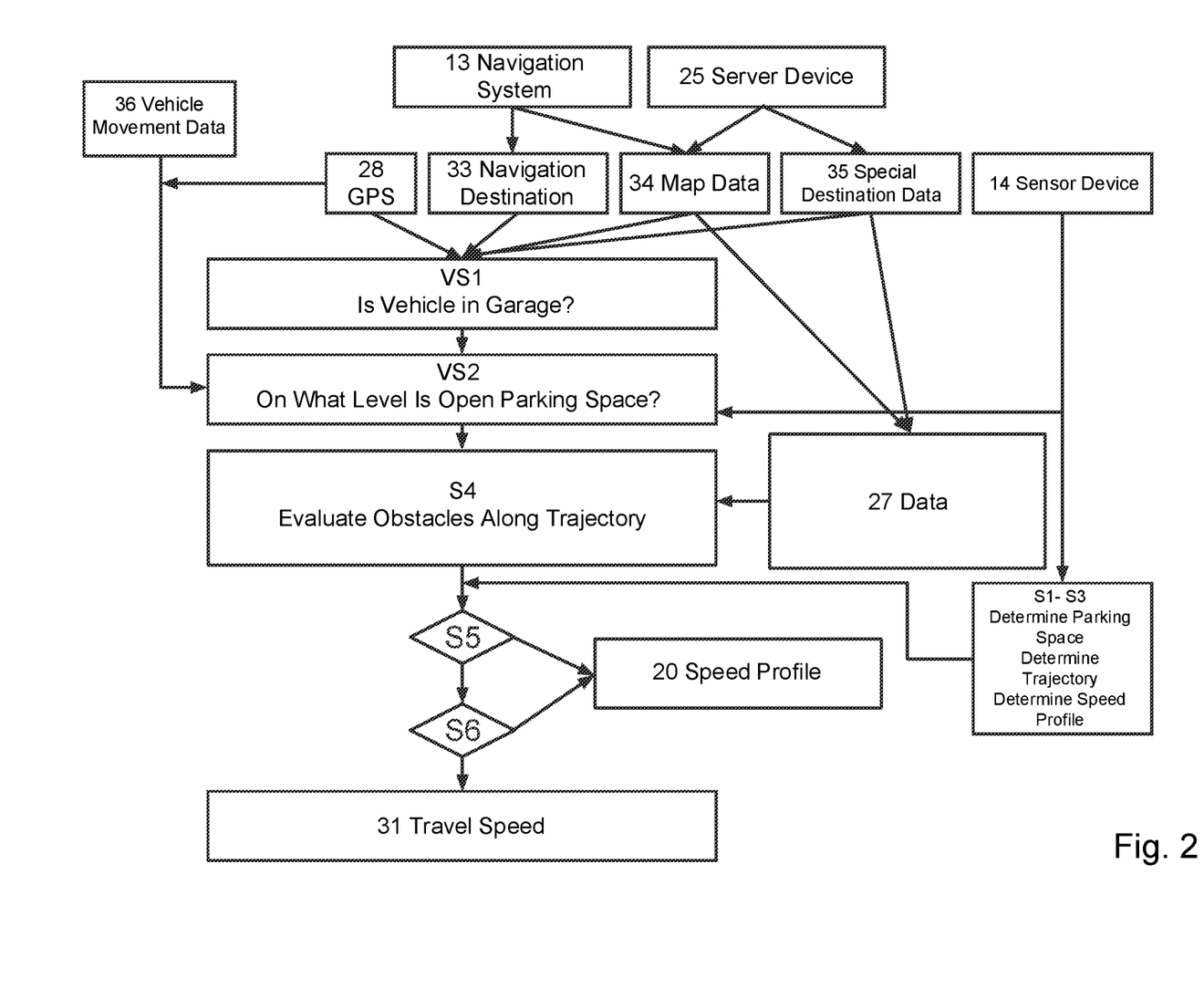
FIG. 2 is a flowchart illustrating a method and data flow for at least a partially automated process of entering or exiting a parking space of a parking infrastructure according to a first embodiment.

Referring also to FIG. 2, the motor vehicle 10 comprises on the vehicle side a navigation system 13, a plurality of sensor devices 14 located proximate to the motor vehicle 10, a computing device 15, a communication device 16, and a control device 17. Alternatively, the motor vehicle 10 may only have an interface or communication link for a vehicle-external navigation system; so that, for example, the navigation system of a mobile end device, for example a mobile phone of a vehicle user, can be accessed.

The computing device 15 and control device 17 minimally comprise a processor, a memory coupled to the processor, computer readable media, and an antenna or other wired or wireless connection device coupled to the processor for receiving and transmitting data, information, messages, and commands or instructions. Exemplary embodiments are implemented on the computing device 15 and the control device 17 and, alternately, on a network server connected to the computing device 15 and control device 17 through the communication link. Computer-executable instructions, or software, are provided for directing the processing of the computing device 15 and the control device 17, including processing the steps of exemplary embodiments for at least partially automated control of the motor vehicle. The computer-executable instructions, when executed by the computing device 15 or the control device 17 and the processor(s) associated with these devices, provide for the control of the motor vehicle as it is directed into or out of a parking space.

One or more storage devices, external to or internal within the computing device 15 and control device 17 are provided for storage of information regarding control of the motor vehicle, including global positioning information, longitudinal control parameters, and speed profiles. Computer readable media includes computer storage media, which includes volatile and non-volatile media, removable and non-removable media implemented in any method or technology for the storage of information, including computer readable instructions, data structures, display templates, and responder information. Computer storage media includes, but is not limited to non-transient memory such as magnetic media (e.g., a hard disk), solid-state drives, optical media (e.g., a DVD); and other memory devices such as random access memory (RAM). In some embodiments, computer readable instructions are configured such that, when executed by a processor, the code causes the exemplary computing device 15 to perform steps described below of the motor vehicle control system (e.g., steps described below with reference to the flow chart shown in FIGS. 2 and 3). In other embodiments, the exemplary computing device 15 and control device 17 are configured to perform steps described below without the need for code. Therefore, the features of the present embodiments described herein can be implemented in any suitable combination of hardware and software. Computer storage media does not include a carrier wave or any other propagated data signal.

The plurality of vehicle-side sensor devices 14 detect the nearby vehicle environment 18 by various sensors, such as cameras, ultrasound sensors, and laser sensors. Information about and identifying the nearby vehicle environment 18 detected by the sensor devices 14 comprises, in particular, free parking spaces 11 and parking spaces 11' occupied by other vehicles 10', a current vehicle position (in particular a starting position 19), a destination position 19', potentially drivable surfaces 21 (such as connection paths between the parking spaces 11 and 11'), or non-traversable obstacles 22 (such as boundary walls). All or part of this information can be stored on computer storage media accessible by the computing device 15 and the control device 17.

Within the embodiment where the user of the motor vehicle 10 is seeking to park the motor vehicle 10, the computing device 15 is notified to be in parking mode. For example, a command can be received by the computing device 15 to park the motor vehicle 10. The computing device 15 then determines the optimal parking space 11 from among the free parking spaces and subsequently determines an optimal travel route in the form of a trajectory 23 from the starting position 19 of the motor vehicle to the destination position 19' at the parking space 11 and specifies a speed profile 20 for driving the motor vehicle 10 along the trajectory 23 to the destination parking space 11. The trajectory 23 extends along a surface of a roadway and takes into account, for example, a minimum distance of the motor vehicle 10 to other vehicles, ground markings, and ground-level obstacles. Preferably, the surface of the roadway runs flat, that is, it has no road bumps, such as ground-level obstacles. Under certain circumstances, the road has a drivable inclination in the form of a longitudinal inclination, for example, to overcome height differences, and a bank, for example, for discharging surface water.

Other example embodiments can be found in the specified speed profile 20, according to which the motor vehicle is driven along the determined trajectory 23. Thereby, at any position of the motor vehicle 10 moving along the trajectory 23, the at least one longitudinal control parameter controls the driving speed of the motor vehicle 10. For example, when moving the motor vehicle 10 from the starting position, the driving speed can start from a zero speed and be slowly increased, then constant over a longer period of time, and finally, before reaching the destination position, slowly decreased until the motor vehicle stops. It is advantageous that the vehicle user perceives a motor vehicle speed that corresponds to the speed profile to be particularly comfortable, because a strong positive or negative driving acceleration is avoided.

The vehicle-side communication device 16 can use a vehicle-external communication device 24 of a vehicle-external server device 25 to establish a communication link 26 for an exchange, that is a transmission and reception, of data 27. Furthermore, the data 27 can be received from a global navigation satellite system 28, such as a GPS, by a vehicle-side receiver 29. The data 27, which may also originate from the navigation system 13 and the vehicle sensors 14, include information regarding objects and depressions in the road, in particular information regarding traversable ground-level obstacles 30 and non-traversable obstacles 22 such as walls, which are located in the nearby vehicle environment 18 and in particular along the trajectory 23. Alternatively or additionally, the trajectory 23 can be determined as a function of the road obstacles and in particular the ground-level obstacles.

The data 27 are evaluated by the computing device 15; and if a ground-level obstacle 30 or non-traversable object 22 is detected, at least one longitudinal control parameter for driving over the object 30 is determined, such as a travel speed 31, an engine power, an engine torque, an engine speed, or a vehicle acceleration for driving over or around the obstacle 30/22. In particular, speed bumps, drainage devices for surface water such as gutters, elevated roadway boundaries such as curbs, or even debris on the ground are understood in this context as ground level and traversable obstacles 30. The travel speed 31 is determined taking into account at least one characteristic parameter of the ground-level obstacle 30, such as an orientation in relation to the trajectory 23, a geometric shape, a height, a geometric dimension, or a surface condition of the ground-level obstacle 30. By having current information available for ground-level obstacles along the trajectory, the longitudinal control parameters can be determined for appropriately setting, for example, a speed profile for overcoming the obstacles. Alternatively or additionally, the trajectory can be determined as a function of road bumps and in particular ground-level obstacles.

Data characterizing road bumps and ground-level obstacles 30 can be provided by at least one data source. The data source can be a server device outside the motor vehicle 10, but connected to the motor vehicle 10 by a communication link and a navigation system of the motor vehicle 10 and a vehicle-side sensor device 14. The vehicle-external server device can be, for example, a public or non-public computer or a cloud service. In this case, the motor vehicle 10 is automatically connected to the at least one vehicle-external server device by the communication link before the planned process of entering or exiting the parking space. In this manner, an exchange of data regarding road bumps and obstacles can be provided between the vehicle-external server device and the motor vehicle 10, in particular the computing device 15.

From the geometric shape of the ground-level obstacle, it can be apparent what kind of ground-level obstacle is involved—for example, a sharp curb or a slowly rising speed bump, wherein the driving speed for driving over the curb side deviates from that driving speed which is necessary for driving over the speed bump. The geometric dimension of the ground-level obstacle in this case characterizes an expression of the geometric shape of the ground-level obstacle. Accordingly, for example, with two speed bumps of the same base area, wherein the base area is arranged on the surface of the road, different demands are placed on the at least one longitudinal control parameter due to a relative altitude and a resulting slope of the respective speed bump. For driving over the steeper and higher speed bump, the driving speed is set higher than when crossing the less steep and lower speed bump.

The at least one longitudinal control parameter can be one or more of an engine power, an engine torque, an engine rotational speed, a vehicle speed, or a vehicle acceleration.

Accordingly, the at least one longitudinal control parameter can influence the driving speed of the motor vehicle 10. If the motor vehicle is to be moved along the trajectory at a constant driving speed, with a ground-level obstacle being located along the trajectory, then the driving speed of the motor vehicle 10 can be kept constant, for example, by adjusting the engine torque. If an increase in the engine torque is necessary to overcome a gradient of the ground-level obstacle, an early increase in the engine torque allows the driving speed to be maintained. It is advantageous that different longitudinal control parameters influence the driving speed of the motor vehicle 10 and can automatically be changed depending on a particular situation.

The condition of the surface of the obstacles over which the motor vehicle will be driving constitutes a topography having physical as well as chemical properties. This topography can be determined by mechanical or optical measuring methods and stored in appropriate databases, along with other characteristics of the obstacles. Based on the characteristics of the surface condition of the ground-level obstacles, such as surface roughness and surface shape, the driving resistance of the ground-level obstacle and subsequently the at least one longitudinal parameter can be deduced. Furthermore, the influence of the surface condition on the driving comfort, in particular on shaking, vibrations and noises, can be taken into account in the longitudinal control.

Various data sources can provide virtual maps or geoinformation in respective databases. For example, these databases can also contain specific information about Points of Interest (POI). This data can be received by the communication device of the motor vehicle 10 and can be evaluated, for example, by the computing device 15. Based on these data, the longitudinal control of the motor vehicle 10 can be adjusted while maneuvering the motor vehicle 10 along the trajectory 23. Possible problems with the automatic longitudinal control, such as an unacceptable subsequent increase in driving speed, can be avoided. Further, it is advantageous that several different data sources can be combined; and the most accurate possible detection of the ground-level obstacles can be made.

Based on the stored data of the ground-level obstacles, the at least one longitudinal control parameter can be matched to respective ground-level obstacles and adjusted in advance. Further, the route which is determined for driving over the ground-level obstacles can be optimized, and information resulting from the at least one parameter, such as the slope, the shape, the surface or the orientation, of the ground-level obstacle can influence the determination of the at least one longitudinal control parameter.

The control device 17, based on at least the partially automatic longitudinal control, directs the motor vehicle 10 to the destination parking space 11. In addition, a transverse control of the motor vehicle 10 can also direct the motion of the motor vehicle 10. In particular, along with automatic longitudinal control along the trajectory of the motor vehicle, transverse control of the motor vehicle is automatically carried out until the destination position is reached. In other words, steering of the motor vehicle is also carried out in the course of the at least partially automated control of the motor vehicle as it is directed from a starting position to a destination position. Here, the motor vehicle is moved by a change of a steering angle along the trajectory, wherein the change takes place independent of the longitudinal control. It is advantageous that the motor vehicle is moved particularly comfortably and safely by the automatic longitudinal and transverse control of the motor vehicle.

Alignment is understood to mean a relationship between the trajectory and an axis, for example a longitudinal axis, of the ground-level obstacle, in particular in the case of elongated, ground-level obstacles. Elongated ground-level obstacles are, for example, elongated speed bumps, the longitudinal extent of which is substantially greater in relation to a transverse extent that is normally aligned with the longitudinal axis. By way of example, the elongated speed bump can be driven over in such a way that the trajectory is aligned normal to the longitudinal axis along a transverse axis. In this case, a minimal route over the elongated speed bump along the trajectory can be selected. This route is characterized by the greatest possible slope and rapid achievement of a maximum increase in the speed bump. It is also conceivable that the elongated speed bump can be crossed obliquely. This means that the trajectory is not arranged normal to the longitudinal axis but, for example, at an angle of 45°. The route over the elongated speed bump is longer than that at 90°, for example, but the slope is lower. By contrast, if the trajectory runs along the longitudinal axis, the route over the obstacle is the greatest possible. At least one wheel of the motor vehicle is located during the crossing on the speed bump and can result in a (low) inclined position of the motor vehicle. Further, the alignment may have an effect on the engine torque in, for example, conical segment-like elevated ground-level obstacles. Depending on whether the conical segment-like obstacle is traversed at the maximum height or offset on a lateral surface of the obstacle, the route changes over the respective obstacle and the slope to be overcome.

Before reaching the ground-level obstacle 30, that is, when a minimum distance between the motor vehicle 10 and the ground-level obstacle 30 is reached, the travel speed 31 is adjusted by the control device 17. The adjusting of the travel speed 31 takes place, for example, as a function of a shape and dimension of the ground-level obstacle 30 and of the predetermined speed profile 20. If the predetermined speed profile 20 and the travel speed 31 deviate from one another, then an adjustment of the travel speed 31 can take place if the ground-level obstacle 30 requires it. If an elevation is detected, the travel speed 31 is set to overcome a driving resistance and to overcome the ground-level obstacle 30 without braking or to prevent a stoppage of the motor vehicle 10. If, by contrast, a depression is detected, the travel speed 31 is set for driving over the ground-level obstacle 30 as gently as possible, thereby minimizing discomfort of the motor vehicle user and avoiding damage to the motor vehicle.

Therefore, the at least one longitudinal control parameter can be adjusted when a distance between a ground-level obstacle and the motor vehicle moving along the trajectory 23 is reduced to a predetermined minimum distance. To timely make a speed or steering adjustment in reaction to the ground-level obstacle, the current vehicle position, for example the starting position at the beginning of the trajectory 23, is determined relative to the position of the ground-level obstacle. In this case, the center of the ground-level obstacle or a point of the ground-level obstacle closest to the vehicle is compared to the current vehicle position. By determining speed and steering changes caused by the ground-level obstacle early along the trajectory, abrupt changes to the motion and direction of the motor vehicle 10 can be avoided, thereby maintaining the comfort of the user of the motor vehicle 10.

In the at least partially automated process of the motor vehicle 10 entering the parking space 11 of the parking garage 12 in FIG. 1, the motor vehicle 10 is located on the parking garage level 32, on which several parking spaces 11 and 11' are arranged side by side in two rows. Using the vehicle-side sensor devices 14, parking spaces 11' occupied with vehicles 10' and the unoccupied parking spaces 11 are identified; and the parking space 11 in which the motor vehicle 10 is to be parked is determined with the computing device 15. The trajectory 23 is determined from the current vehicle position identified as the starting position 19 along the drivable surface 21 to the destination position 19' at the parking space 11. Further, the speed profile 20 for driving the trajectory 23 is determined and selected. In order to react to possible road bumps along the trajectory 23 and minimize any discomfort to the vehicle user or damage to the motor vehicle, provided data 27 are evaluated by the computing device 15 to facilitate a smooth travel along the trajectory 23 to the destination parking space 19' as a function of the trajectory 23 and speed profile 20.

Referring still to FIG. 1, a plurality of spatially separated ground-level obstacles 30, two conical segment-like raised speed bumps, and a recessed drainage channel along the trajectory 23 are detected with data from the sensor devices 14. Based on the data 27, the travel speeds 31 for driving over the respective ground-level obstacle 30 are determined by the computing device 15. During the actual process of driving along the trajectory 23 to the parking space 19' in combination with the crossing of the detected ground-level obstacles 30, the movement of the motor vehicle 10 from the starting position 19 to the destination position 19', and the parking of the motor vehicle 10 at the destination position 19' in the parking space 11, at least the longitudinal control is carried out automatically by the control device 17. Before a respective ground-level obstacle 30 is reached, the travel speed 31 is set when the distance between the motor vehicle 10 and the respective ground-level obstacle 30 is determined to be at a minimum distance. After driving over the respective ground-level obstacle 30, the travel speed 31 is reset to the speed profile 20.

Accordingly, in anticipation of the ground-level obstacle 30, the at least one longitudinal control parameter is set; and, after driving over the ground-level obstacle, a setting of the at least one longitudinal parameter is reset. If the at least one longitudinal parameter is the driving speed, then that driving speed which was determined for driving the trajectory taking into account the speed profile and which was increased in order to drive over the at least one ground-level obstacle, is set again after driving over the ground-level obstacle. This feature provides that a brief increase or decrease in the driving speed is reversed as soon as the crossing of the ground-level obstacle has been completed. Both the short-term increase or decrease and a reversal process are each caused by the control device 17. Therefore, a driving behavior particularly adapted to obstacles along the trajectory can be implemented, and the motor vehicle can be automatically operated efficiently and smoothly when driving the trajectory.

Figure 3:
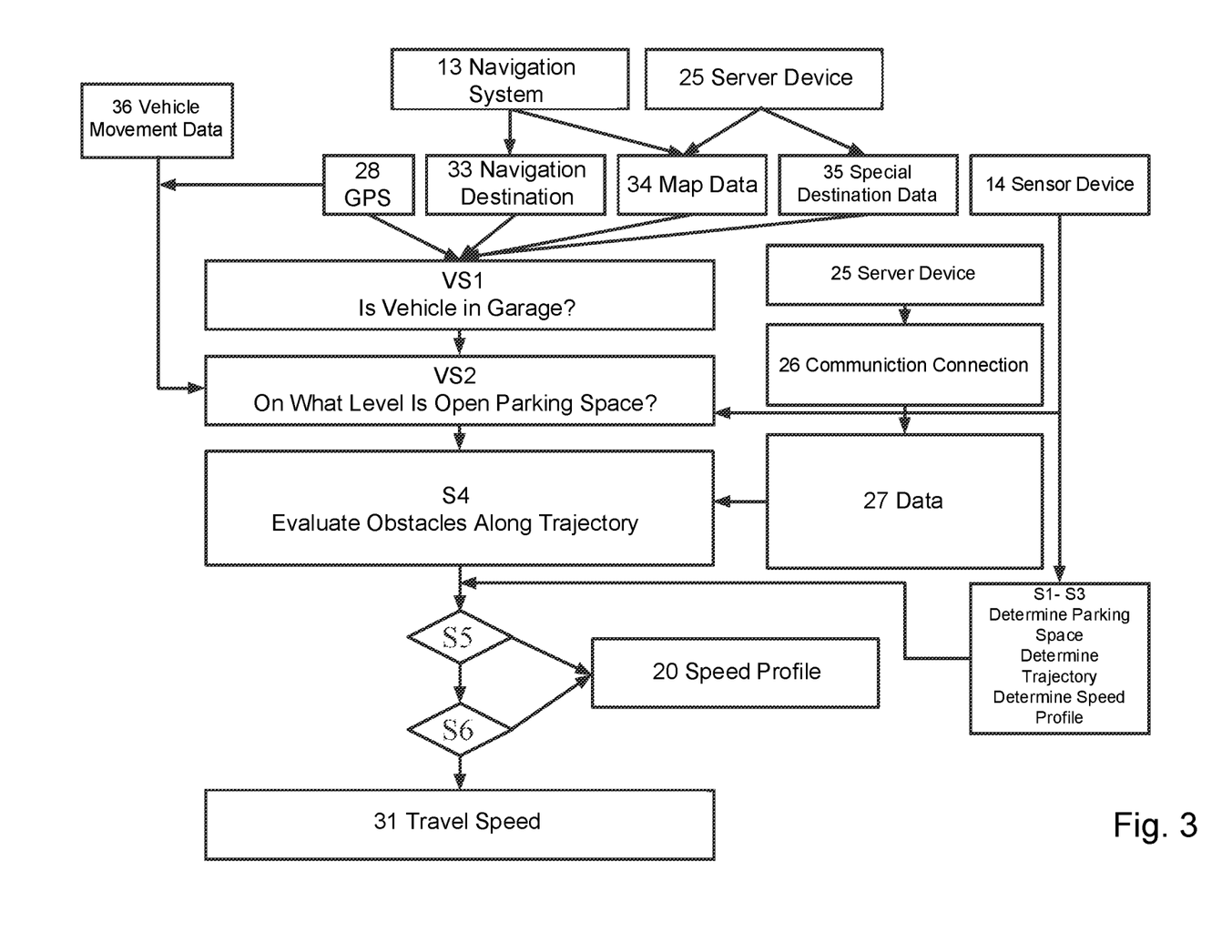
FIG. 3 is a flowchart illustrating a method and data flow for at least a partially automated process of entering or exiting a parking space of a parking infrastructure according to a second embodiment.

Referring to both FIG. 2 and FIG. 3, the method and the flow of data for the at least partially automated process of the motor vehicle 10 entering the parking space 11 is schematically outlined, which is carried out by the vehicle-side control device 17. Both representations show similar method procedures and data flow and differ only in method step S4, in which different data sources are used. To carry out the method in the parking infrastructure designed as a multi-story car garage 12, optional preparatory method steps VS1 and VS2 are carried out, which are necessary for carrying out the method in this specific embodiment.

In a preparatory method step VS1, it is determined whether the motor vehicle is located within the parking garage 12. For this purpose, various location information of the navigation system 13, the vehicle-external server device 25 and the global navigation satellite system 28 are provided. In this embodiment, the data include a navigation destination 33 from a destination input by the vehicle user and also a digital map data 34 and special destination data 35 from databases of the navigation system 13 and the vehicle-external server 25, wherein the vehicle server 25 can be communicatively connected to the parking infrastructure. Further, position data are received by the vehicle-side receiving device 29 from the global navigation satellite system 28. If, for example, the motor vehicle is being controlled in a partially automated manner from an entry area of the parking garage on a first parking infrastructure level to a parking space of a second parking infrastructure level which is different from the first parking infrastructure level, then the starting position and the destination position are on mutually different parking infrastructure levels. Also, the parking garage can communicate data that identifies road bumps within the parking infrastructure. Accordingly, the information needed for driving over the ground-level obstacles can be provided to the motor vehicle 10 via the direct communication connection by the vehicle-external server device.

In a further preparatory method step VS2, a current parking garage level 32 is determined, on which the destination free parking space 11 is located. For this purpose, vehicle movement data 36 is combined with position data of the global navigation satellite 28, and values from other measurements of the vehicle-side sensor devices 14 are used for determining the motor vehicle's current parking garage level location. Further, a detection of specific parking infrastructure elements, such as ticket machines, barriers, or ramps, can provide information about the respective parking garage level 32 with data from the vehicle-side sensor devices 14. In order to get from the parking infrastructure level of the starting position to the parking infrastructure level of the destination position, for example, a height difference between the respective parking infrastructure levels must be overcome during the process of entering or exiting a parking space. Those data, which include structural conditions of the parking infrastructure, in particular parking infrastructure levels and connections between the respective parking infrastructure levels, can be provided, for example, by a server device of the vehicle infrastructure outside of the vehicle, and associated with the parking infrastructure. This height difference can be taken into account when determining the trajectory and the road bumps arranged along the trajectory and can be overcome during the at least partially automated movement of the motor vehicle between the parking infrastructure levels. The acquisition of specific parking infrastructure elements is not graphically depicted.

In the method steps S1-S3, the parking space 11, the trajectory 23 for reaching the parking space 11, and the speed profile 20 for driving the trajectory 23 are determined. In this case, the information about the vehicle environment 18 detected by the vehicle-side sensor devices 14, for example by ultrasonic sensors, is evaluated by the computing device 15.

In a next method step S4, data 27, which characterize obstacles at least along the trajectory 23, are evaluated by the computing device 15. In FIG. 2, the data 27 are provided from digital map data 34 and special destination data 35 of the databases of the navigation system 13 and the vehicle-external server device 25. In contrast, in FIG. 3, the data 27 originate exclusively from the vehicle-external server device 25 assigned to the parking garage 12, which transmits the data 27 via the communication link 26.

If a ground-level obstacle 30 along the trajectory 23 is detected in method step S5 during a comparison of the trajectory 23 and the data 27 identifying the roadway obstacles, the predefined speed profile 20 is checked in step S6 to determine whether the predefined speed profile 20 is suitable for driving over the ground-level obstacle 30. The predefined speed profile 20 can also be checked in step S6 to determine whether the speed profile 20 is sufficient for driving over the ground-level obstacle 30. For this purpose, parameters of the ground-level obstacle 30, such as the orientation in relation to the trajectory 23, the geometric shape, its dimensions, and the surface texture are used. If the travel speed 31 is higher than the predefined speed profile 20, the travel speed 31 is adjusted accordingly.

If, on the other hand, no ground-level obstacle 30 is detected in method step S5 or if the speed profile 20 is suitable for driving over the ground-level obstacle 30 despite the detected ground-level obstacle 30, as is checked in method step S6, then the longitudinal control, including the travel speed 31, is not adjusted. The trajectory 23 is then maintained, and the detected ground-level obstacle 30 is driven on or driven over with the speed profile 20.

Overall, the example shows how the method the at least partially automated process of the motor vehicle 10 entering the parking space 11 can be implemented, when the motor vehicle 10 is controlled while being directed along the trajectory 23 to the parking space 11 with the speed profile 20. If ground-level obstacle 30 is located along the trajectory 23, the travel speed 31 for driving over the ground-level obstacle 30 can be adjusted. The data 27 can be provided by different data sources. While the motor vehicle is being directed into or out of a parking space, the control device 17 controls at least the steering, braking, and speed of the motor vehicle to facilitate the at least partially automated control of the motor vehicle.

As can be appreciated, the one or more sensor devices 14 can constantly and repeatedly detect elements of the nearby vehicle environment, and the control device 17 can automatically modify the speed profile and the trajectory 23 of the motor vehicle as the nearby environment changes. For example, if another motor vehicle begins to exit from a parking space, the speed profile 20 can be dynamically adjusted to stop the moving motor vehicle until the exiting motor vehicle has cleared the trajectory. Similarly, the trajectory 23 can be dynamically altered to redirect the parking motor vehicle around and exiting motor vehicle.

For example, during at least partially automated control of the motor vehicle 10 when entering or exiting a parking space, the motor vehicle 10 is moved at least in a partially automatic manner until reaching the destination position 19' along the determined trajectory 23 by at least one longitudinal control of the motor vehicle taking place automatically, taking into account the at least one determined longitudinal control parameter. The longitudinal control regulates at least acceleration or braking processes. For example, the at least one longitudinal control parameter of the motor vehicle for traversing the trajectory 23 resulting from a predefined speed profile 20, is compared with the at least one longitudinal control parameter for passing over the ground-level obstacle 30 by the computing device 15. If a difference between the respective longitudinal control parameters is detected, then an adjustment takes place. This is necessary, since different demands are placed on the longitudinal control when driving along the trajectory 23 of a preferably flat surface and the surface of the road having road bumps and obstacles. Thus, due to the known ground-level obstacle 30, a reaction can automatically be made before reaching the ground-level obstacle 30. The automatic longitudinal control is a function of the control device 17 of the motor vehicle 10.

The trajectory 23 and speed profile 20 for at least partially automated control of the motor vehicle 10 are typically determined at the beginning of the process of moving the motor vehicle from a starting position to the destination position. Thus, early detection and, as a consequence, an early and planned response to the ground-level obstacles encountered along the trajectory 23 allows anticipatory control of the motor vehicle, whereby the ride comfort for the vehicle user seated in the motor vehicle remains positive during the at least partially automated entrance to or exit from a parking space. Further, damage to the motor vehicle, for example to its suspension damping system, can be avoided, which can result from driving over a ground-level obstacle at an excessive driving speed.

An advantage of the methods disclosed herein is that the automatic longitudinal control of the motor vehicle 10, based on the determined longitudinal control parameter and the ground-level obstacle, movement of the motor vehicle along the trajectory 23 is directed at an optimum travel speed, even if the ground-level obstacle is encountered along the trajectory 23. The optimum driving speed, for example, takes into account the given speed profile 20. Further, it is advantageous that driving over the ground-level obstacle can be initiated and planned at an early stage of the trajectory traversal. This means, for example, that a vehicle user perceives only slight vibrations when driving over the ground-level obstacle because the appropriate braking and speed are controlled, and the driving comfort of the vehicle user is increased. Also, while the motor vehicle 10 is at least partially moved along the trajectory, it is not abruptly decelerated by the at least one ground-level obstacle, since at least one determined longitudinal control parameter is set early in the course of the automatic longitudinal control.

According to other example embodiments, the motor vehicle 10 can be localized based on at least one of the following location information: digital map data and sensor data of the motor vehicle, and a destination entry of a vehicle user. The localization comprises a determination of the current vehicle position and an orientation of the motor vehicle within the motor vehicle's environment. The digital map data can originate, for example, from databases of the vehicle-external server device or the navigation system. Sensor data of the motor vehicle can include, for example, values from odometric measurements or measurements from environmental sensors. These values are detected in particular by angle sensors such as steering angle sensors for an electronic stability control (ESP), ultrasonic sensors such as distance sensors or rotation-rate sensors such as yaw sensors of the ESP or an antilock braking system (ABS). This data can be combined with location information from a global navigation satellite system such as GPS, GLONASS, Galileo, or Beidou. For this purpose, the location information of the global navigation satellite system is received by the vehicle-side receiving device. The destination input of the vehicle user can be done by an active input on a user interface of the navigation system. Further, additional location information of the vehicle user, such as calendar entries, can be used for localization. The current vehicle position and the orientation of the motor vehicle can be determined by localization. Based on this data the trajectory or the minimum distance to a ground-level obstacle can be determined. The localization also allows at least partially automated control of the motor vehicle within the vehicle environment. Particular geographical features, such as non-traversable objects, spatial limitations, the inclination of the road or infrastructure components of the vehicle environment can be included in the determination of the trajectory and subsequently in the determination of the speed profile and the at least one longitudinal parameter of the vehicle speed.

Similarly, a process of the motor vehicle 10 exiting a parking space can be carried out utilizing the same devices, data, and controls as the motor vehicle 10 entering a parking space, wherein the motor vehicle 10 is removed from the parking space 11 from the starting position 19 at the parking space 11 and directed to the destination position 19' different from the starting position 19.

The various embodiments described above are provided by way of illustration only and should not be construed to limit the scope of the claims attached hereto. Those skilled in the art will readily recognize various modifications and changes that may be made without following the example embodiments and applications illustrated and described herein, and without departing from the true spirit and scope of the following claims. It is intended that any such modifications and equivalents be included in the scope of the claims.

What is claimed is:

1. A method for at least partially automated control of a motor vehicle while entering or exiting a parking space, comprising:
   receiving a command to park the motor vehicle in a parking space or to exit the parking space;
   receiving sensor information detecting the environment of the motor vehicle;
   determining a destination position to which the motor vehicle is to be moved;
   determining a trajectory for reaching the destination position, beginning from a starting position of the motor vehicle;
   receiving data regarding obstacles located along the trajectory;
   selecting a speed profile for controlling the speed of the motor vehicle, based on the received sensor information, the determined destination position, the determined trajectory, and the received obstacle data;
   for each obstacle located along the trajectory, determining at least one longitudinal control parameter of the motor vehicle for driving over the located obstacle;
   initiating at least partially automated movement of the motor vehicle along the trajectory from the starting position until reaching the destination position based on the selected speed profile and the one or more determined longitudinal control parameters; and
   automatically adjusting the trajectory and/or the speed of the motor vehicle based on changes in the received sensor information.

2. The method according to claim 1, further comprising:
   specifying a speed profile according to which the motor vehicle is to travel the determined trajectory, wherein the automated movement along the trajectory takes place outside the located obstacle while maintaining the speed profile.

3. The method according to claim 1, further comprising:
   automatically providing transverse control of the motor vehicle until reaching the destination position.

4. The method according to claim 1, further comprising:
   for entering a parking space, directing the motor vehicle into the parking space from the starting position outside the parking space to the destination position within the parking space; and
   for exiting the parking space, directing the motor vehicle from the starting position within the parking space to the destination position outside the parking space.

5. The method according to claim 1, further comprising:
   if the starting position and/or the destination position are located within a parking infrastructure, determining the parking infrastructure level of the starting position and/or the destination position before determining the trajectory.

6. The method according to claim 1, wherein the at least one longitudinal control parameter comprises one or more of:
   an engine power;
   an engine torque;
   an engine speed;
   a vehicle speed; and
   a vehicle acceleration.

7. The method according to claim 6, further comprising:
   determining the at least one longitudinal control parameter when a distance between the located obstacle and the motor vehicle reaches a minimum distance when driving along the trajectory with the motor vehicle.

8. The method according to claim 1, further comprising:
   before the located obstacle has been reached, determining the at least one longitudinal control parameter; and
   after driving over the located obstacle, adjusting the at least one longitudinal parameter.

9. The method according to claim 1, wherein the at least one longitudinal control parameter is determined based on at least one parameter characterizing the located obstacle.

10. The method according to claim 9, wherein the at least one characteristic parameter comprises at least one of the following pieces of information:
    a geometric shape of the located obstacle;
    at least one geometric dimension of the located obstacle;
    a surface composition of the ground-level obstacle; and
    an orientation of the located obstacle in relation to the trajectory.

11. The method according to claim 1, wherein the located obstacle data is provided by at least one data source, wherein the data source comprises one or more of:
    a vehicle-external server device connected to the motor vehicle by a communication link;
    a navigation system of the motor vehicle; and
    a vehicle-side sensor device.

12. The method according to claim 11, wherein the vehicle-external server device is part of the parking infrastructure.

13. The method according to claim 1, wherein the motor vehicle is located based on at least one of the following pieces of location information:
    digital map data;
    sensor data of the motor vehicle; and
    a destination input of a vehicle user.

14. A system for providing at least partially automated control of a motor vehicle during a process of entering or exiting a parking space, comprising:
    a plurality of sensor devices located proximate to the motor vehicle configured to provide sensory data representative of an environment around the motor vehicle;

a computing device comprising a first processor configured to:
  receive a command to park the motor vehicle in a parking space or to exit the parking space;
  receive sensor information detecting the environment of the motor vehicle;
  determine a destination position to which the motor vehicle is to be moved;
  determine a trajectory for reaching the destination position, beginning from a starting position of the motor vehicle;
  receive data regarding obstacles located along the trajectory;
  select a speed profile for controlling the speed of the motor vehicle, based on the received sensor information, the determined destination position, the determined trajectory, and the received obstacle data; and
  for each obstacle located along the trajectory, determine at least one longitudinal control parameter of the motor vehicle for driving over the located obstacle; and
a control device comprising a second processor configured to:
  initiate at least partially automated movement of the motor vehicle along the trajectory from the starting position until reaching the destination position based on the selected speed profile and the one or more determined longitudinal control parameters; and
  automatically adjust the trajectory and/or the speed of the motor vehicle based on changes in the received sensor information.

15. The system according to claim 14, wherein the first processor is further configured to specify a speed profile according to which the motor vehicle is to travel the determined trajectory, wherein the automated movement along the trajectory takes place outside the located obstacle while maintaining the speed profile.

16. The system according to claim 14, wherein the first processor is further configured to:
  for entering a parking space, direct the motor vehicle into the parking space from the starting position outside the parking space to the destination position within the parking space; and
  for exiting the parking space, direct the motor vehicle from the starting position within the parking space to the destination position outside the parking space.

17. The system according to claim 14, wherein the first processor is further configured to:
  if the starting position and/or the destination position are located within a parking infrastructure, determine the parking infrastructure level of the starting position and/or the destination position before the trajectory is determined.

18. The system according to claim 14, wherein the first processor is further configured to determine the at least one longitudinal control parameter when a distance between the located obstacle and the motor vehicle reaches a minimum distance when driving along the trajectory with the motor vehicle.

19. The system according to claim 14, wherein the first processor is further configured to:
  before the located obstacle has been reached, determine the at least one longitudinal control parameter; and
  after driving over the located obstacle, adjust the at least one longitudinal parameter.

20. A non-transitory computer readable medium having computer readable instructions stored thereon which, when executed by a processor, provide for at least partially automatic control of a motor vehicle comprising:
  receiving a command to park the motor vehicle in a parking space or to exit the parking space;
  receiving sensor information detecting the environment of the motor vehicle;
  determining a destination position to which the motor vehicle is to be moved;
  determining a trajectory for reaching the destination position, beginning from a starting position of the motor vehicle;
  receiving data regarding obstacles located along the trajectory;
  selecting a speed profile for controlling the speed of the motor vehicle, based on the received sensor information, the determined destination position, the determined trajectory, and the received obstacle data;
  for each obstacle located along the trajectory, determining at least one longitudinal control parameter of the motor vehicle for driving over the located obstacle;
  initiating at least partially automated movement of the motor vehicle along the trajectory from the starting position until reaching the destination position based on the selected speed profile and the one or more determined longitudinal control parameters; and
  automatically adjusting the trajectory and/or the speed of the motor vehicle based on changes in the received sensor information.

* * * * *